United States Patent [19]

Lockhart

[11] 4,300,273
[45] Nov. 17, 1981

[54] METHOD FOR MAKING LAMINATED SPACER PLATE FOR ENGINES

[75] Inventor: David A. Lockhart, Bartonville, Ill.

[73] Assignee: Caterpillar Tractor Co., Peoria, Ill.

[21] Appl. No.: 95,857

[22] Filed: Nov. 19, 1979

Related U.S. Application Data

[62] Division of Ser. No. 955,083, Oct. 26, 1978, Pat. No. 4,211,205.

[51] Int. Cl.³ .............................................. B23P 15/00
[52] U.S. Cl. ................................ 29/156.4 R; 156/264; 156/300; 113/116 V; 29/417
[58] Field of Search ................... 29/156.4 R, 416, 417; 113/116 V, 116 BB; 156/264, 260, 300; 123/193 CH, 193 H, 193 R, 41.84; 277/235 B, 235 R; 138/42

[56] References Cited

U.S. PATENT DOCUMENTS

| | | | |
|---|---|---|---|
| 1,470,497 | 10/1923 | Steenstrup | 29/156.4 R |
| 1,839,889 | 1/1932 | Palais | 156/264 |
| 2,034,610 | 3/1936 | Dickson | 277/235 B |
| 2,089,254 | 8/1937 | Fitzgerald | 277/235 B |
| 2,113,904 | 4/1938 | Rippe | 123/188 |
| 2,114,442 | 4/1938 | Fitzgerald | 277/235 B |
| 2,130,110 | 9/1938 | Victor et al. | 277/235 B |
| 2,157,102 | 5/1939 | Victor et al. | 277/235 B |
| 2,234,214 | 3/1941 | Young | 29/417 |
| 2,417,175 | 3/1947 | Raffles | 156/264 |
| 2,454,609 | 11/1948 | Miller | 113/116 V |
| 2,525,131 | 10/1950 | Hallett | 123/33 |
| 2,756,496 | 7/1956 | Holland | 156/197 |
| 2,788,782 | 4/1957 | Schmidt | 123/193 CH |
| 3,047,934 | 8/1962 | Magner, Jr. | 156/535 |
| 3,396,711 | 8/1968 | Fangman et al. | 123/193 CH |
| 3,473,813 | 10/1969 | Meyers et al. | 277/180 |
| 3,619,082 | 11/1971 | Meginnis | 29/156.8 H |
| 3,738,558 | 6/1973 | Colwell | 277/235 B |
| 3,811,689 | 5/1974 | Farnam | 277/235 B |
| 3,885,889 | 5/1975 | Bares et al. | 417/274 |
| 4,050,479 | 9/1977 | Baumann | 138/42 |

Primary Examiner—Daniel C. Crane
Attorney, Agent, or Firm—Paul S. Lempio

[57] ABSTRACT

A laminated spacer plate (10) for engines, pumps and the like comprises a plurality of metallic sheets (11–14), each having openings (15,16,17,24,40) preformed therethrough and secured together. The preforming of the openings through the individual sheets facilitates intercommunication of certain of the openings with passages formed within the spacer plate and eliminates the need for costly machining and related manufacturing operations normally required for the fabrication of a one-piece spacer plate.

7 Claims, 7 Drawing Figures

METHOD FOR MAKING LAMINATED SPACER PLATE FOR ENGINES

This is a division of Ser. No. 955,083, filed Oct. 26, 1978, now U.S. Pat. No. 4,211,205, issued July 8, 1980.

TECHNICAL FIELD

This invention relates to a laminated spacer plate for engines, pumps, compressors and the like and a method for making the spacer plate from a plurality of superimposed sheets.

A spacer plate may be employed between the block and head of an internal combustion engine to prevent any hairline cracks from occurring in the block upon operation of the engine. In particular, the relatively high gas pressures developed in a diesel engine, for example, create forces which must be fully absorbed by the block. Prior to the advent of the spacer plate, a counterbore as formed in the block to accommodate a support flange of a cylinder liner and the head was secured directly to the block. Due to the aforementioned gas pressures and resulting forces imposed on the block, hairline cracks were occassionally developed in the area of the counterbore.

The utilization of a spacer plate between the head and block, with the spacer plate having a thickness substantially equaling the thickness of the support flange of the cylinder liner, has virtually eliminated this cracking problem. However, the spacer plate has heretofore been fabricated as a one-piece member having a thickness in the range of about 11.1125 mm. When the steel stock comprising the spacer plate is subjected to a standard stamping operation to form the various water and oil director ports and bolt holes therethrough, a subsequent grinding operation is required to eliminate the relatively large "roll-over" formed at the entrance side for the punch or male die forming each opening and hole.

In addition, the liner bores must be precisely formed through the plate by additional stamping and machining operations, due to the close proximity of the previously formed bolt holes and director ports thereto. In addition, the somewhat irregular inlet and exhaust slots normally require a separate flame-cutting operation to form them through the spacer plate. Those skilled in the arts relating hereto will further appreciate that difficulty is oftentimes encountered to hold the machining tolerances within prescribed requirements to provide flat surfaces on the plate to insure efficient clamping and sealing thereof between standard head gaskets disposed on either side thereof. A typical one-piece spacer plate of this type is disclosed in U.S. Pat. No. 3,396,711, issued on Aug. 13, 1968 to C. N. Fangman et al. and assigned to the assignee of this application.

DISCLOSURE OF THE INVENTION

The present invention is directed to overcoming one or more of the problems as set forth above.

This invention is drawn to a method for preforming and mounting a laminated spacer plate in an engine and comprises the steps of forming a plurality of openings through each of a plurality of separate sheets, aligning the sheets and at least some of their openings, securing the sheets together to form a laminated spacer plate having a composite thickness at least substantially the same as the thickness of a support flange of a cylinder liner, mounting the laminated spacer plate between the head and block of an engine, and mounting a sealing gasket between the spacer plate and each of the head and block of the engine.

BRIEF DESCRIPTION OF THE DRAWINGS

Other objects of this invention will become apparent from the following description and accompanying drawings wherein.

BEST MODE FOR CARRYING OUT THE INVENTION

Figures 1, 2:
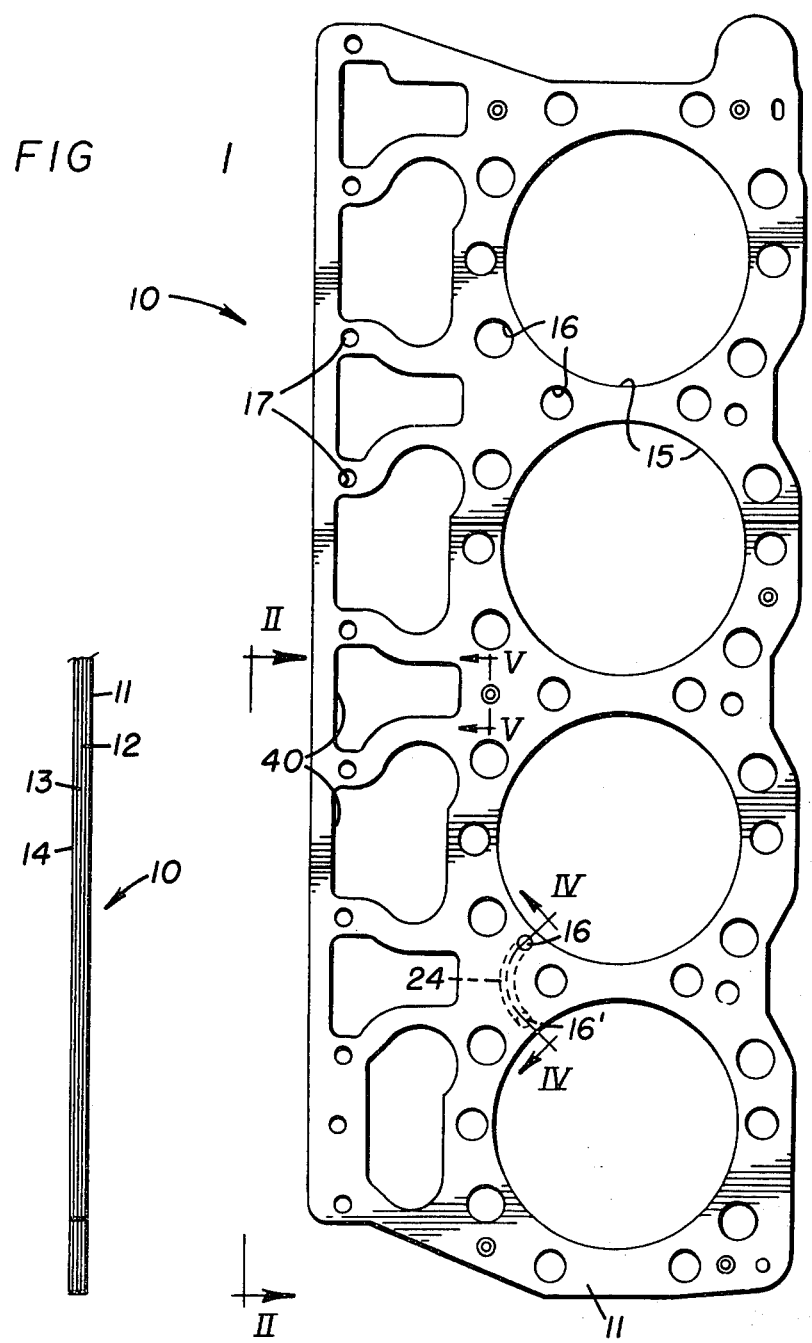
FIG. 1 is a top plan view of a spacer plate embodiment of the present invention.
FIG. 2 is a partial side elevational view of the spacer plate, taken in the direction of arrows II—II in FIG. 1 to illustrate the laminated construction of the spacer plate.

FIG. 1 illustrates a laminated spacer plate 10 adapted for mounting in an internal combustion engine, such as a diesel engine. As will be appreciated by those skilled in the art, the spacer plate has application to a wide variety of other types of power translators, such as fluid pumps and the like. As shown in FIG. 2, the spacer plate may be composed of a plurality (preferably from four to nine) of superimposed metallic (preferably aluminum or steel) sheets 11–14 of uniform thickness and suitably secured together, as more fully described hereinafter. The sheets are preferably composed of a metallic material to withstand the relatively high pressure and temperature levels created during engine operation and to resist extrusion thereof, i.e., a plastic material, for example, may tend to extrude when clamped in place in an engine. In the embodiment illustrated in FIG. 1, the spacer plate has a plurality of standard openings formed therethrough, such as circular cylinder bore openings 15, oil and water ports 16, and bolt holes 17.

Figure 3:
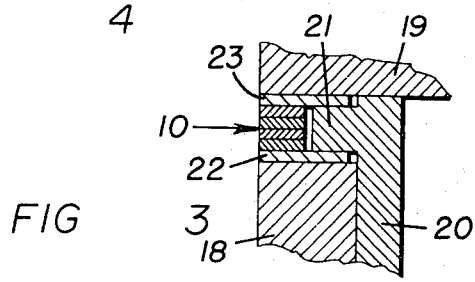
FIG. 3 is a partial sectional view illustrating the spacer plate mounted between a block and head of an internal combustion engine to space a support flange of a cylinder liner therebetween.

FIG. 3 partially illustrates an internal combustion engine comprising a cast iron block 18 and a head 19 and a cylinder liner 20 having a radial support flange 21 thereof suitably mounted and supported on the block. Spacer plate 10 is disposed in sandwiched relationship between the block 18 and head 19, along with a pair of standard sealing gaskets 22 and 23 which function to provide a seal about the periphery of the engine block in a conventional manner. The spacer plate has a composite thickness (e.g., 11.1125 mm.) substantially the same as the thickness of flange 21 and is compressed between head 18 and block 19 to function in a conventional manner to prevent forces generated in the engine during operation thereof from creating any cracks or the like in the block.

Figure 4:
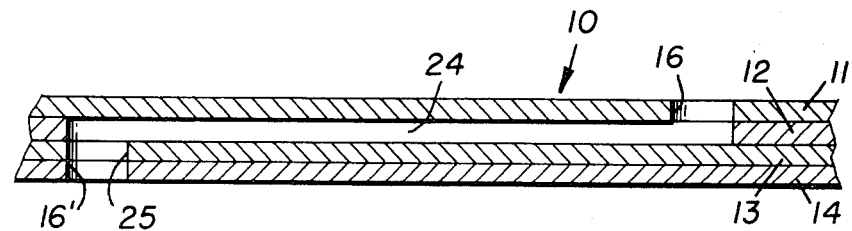

Referring to FIG. 4, it should be noted that spacer plate 10 may be constructed to have one opening or port 16 formed through one outer or first sheet 11 communicating with another port 16', formed throughout second sheet 14, without having to resort to exotic manufacturing techniques. In particular, openings 16 and 16' may be preformed by separate stamping operations in sheets 11 and 14, respectively, along with a slot 24 formed in inner third sheet 12 and a port 25 formed in inner fourth sheet 13. Thus, when the four sheets are secured together, slot 24 will define a passageway in spacer plate 10 for communication of water or lubricating oil therebetween. It is difficult to envision any manufacturing process whereby a similar passage could be formed in a conventional one-piece spacer plate.

It will thus become apparent to those skilled in the arts relating hereto that various interconnecting passages can be defined in the spacer plate by preforming the desired openings, holes, slots and the like in the individual sheets comprising the spacer plate.

For example, if it proves undesirable to increase the cross-sectional area of a particular passageway, a slot similar to slot 24 could also be formed through sheet 13. Also, it should be understood that such slots could be formed to a limited depth in one or more particular sheets, rather than completely therethrough, if so desired.

Although FIG. 4 illustrates a laminated construction wherein four sheets 11-14 are employed for a particular spacer plate application, it should be understood that any desired number of two or more sheets may be suitably preformed and secured together as described more fully hereinafter. The sheets may be secured together by any suitable means, such as a standard adhesive (e.g., No. XA5773 manufactured by the Minnesota Mining and Manufacturing Company) having the desired properties for metal-to-metal bonding, by furnace brazing or resistance or electric welding techniques, for example. In the spacer plate application herein described, it is desirable to secure all contacting surfaces of the sheets together to prevent any leakage problems as between the various ports and other openings formed through the sheets.

Figure 5:
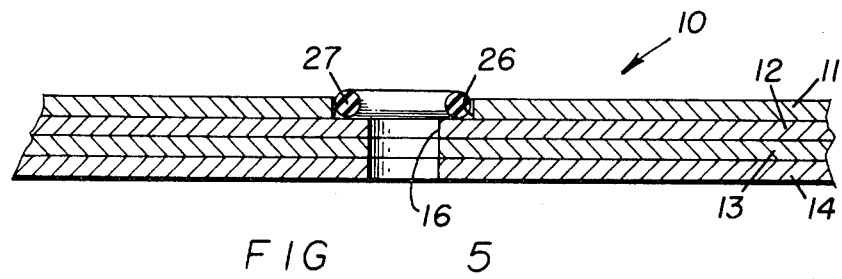
FIGS. 4 and 5 are enlarged sectional views of portions of the spacer plate, taken in the directions of arrows IV—IV and V—V, respectively, in FIG. 1.

FIG. 5 illustrates another sectional view of spacer plate 10 wherein one of the ports 16 terminates at a counterbore 26, formed through a particular outer sheet 11. When the plate is clamped in place between block 18 and head 19 of an engine (FIG. 3), it would normally prove desirable to mount an annular elastomeric O-ring seal 27 in counterbore 26 to form a static seal thereat. Pre-punched counterbore 26 thus eliminates the need for machining a corresponding counterbore in a one-piece conventional spacer plate 28, illustrated in FIG. 6.

Figure 6:
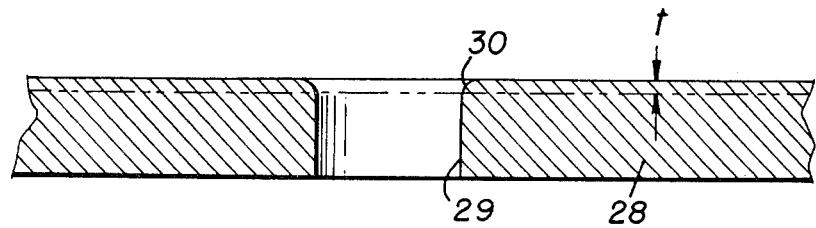
FIG. 6 is a view similar to FIG. 5, but illustrating a corresponding portion of a conventional spacer plate.

As further shown in FIG. 6, when a water director port 29 or the like is punched through conventional spacer plate 28, a "roll-over" bead 30 is inherently formed at the entrance side of port 29 whereat the punching die enters. This "roll-over" thus necessitates a costly grinding operation to remove a layer of material, having a thickness "t", from the upper side of plate 28. Furthermore, liner bores 15 (FIG. 1) must be machined after the stamping or punching operation due to the close proximity of director holes 16 and bolt holes 17 thereto. Also, since the stamping operation could function to slightly deform the underside of spacer plate 28, such side might also require machining to provide flat surfaces on either side of the spacer plate for proper installation in the engine. As further suggested above, conventional spacer plate 28 requires a flame-cutting process or the like to define inlet and exhaust manifold slots therethrough.

INDUSTRIAL APPLICABILITY

Figure 7:
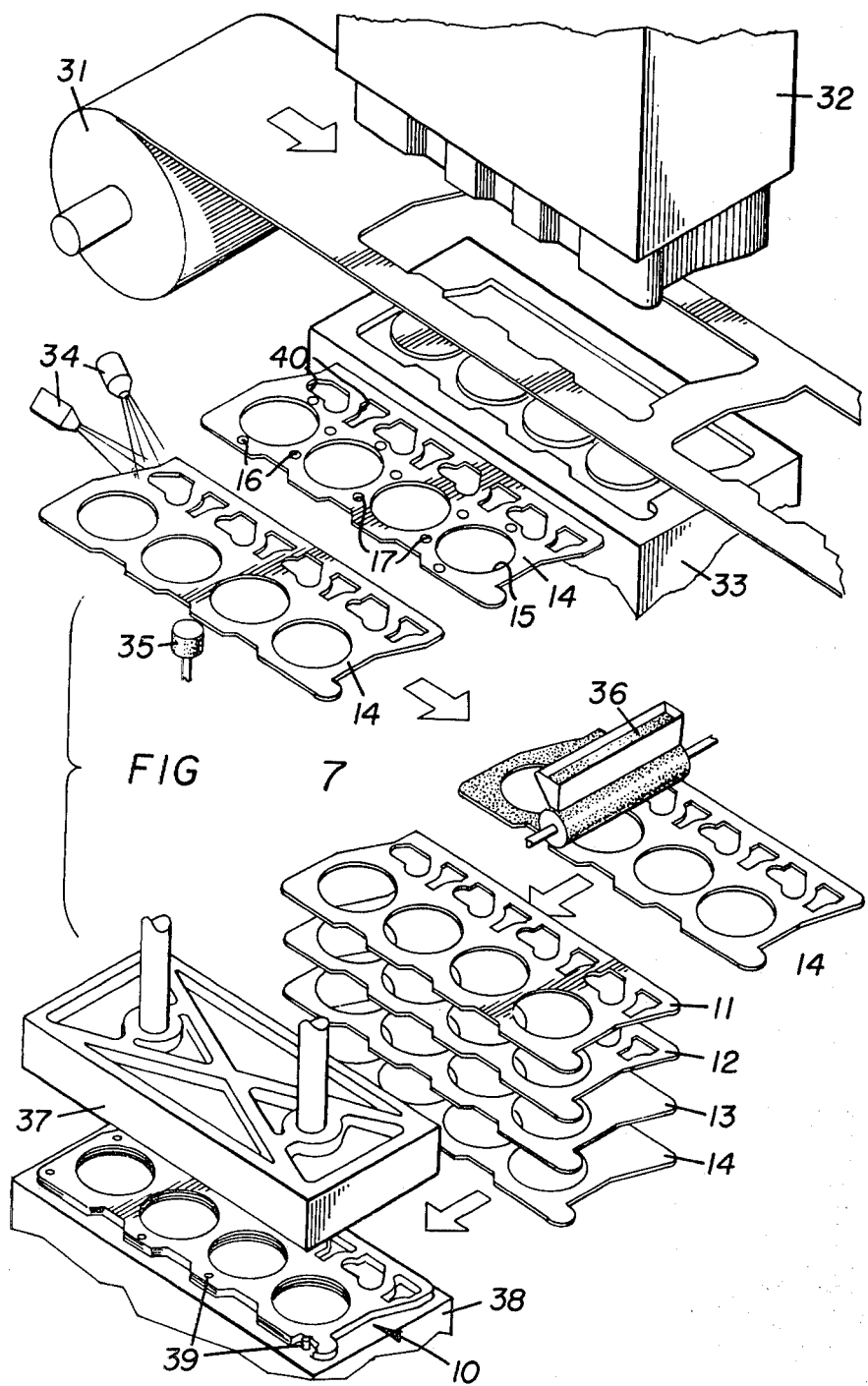
FIG. 7 illustrates an apparatus and method for forming the FIG. 1 spacer plate.

FIG. 7 is a flow diagram illustrating a method and apparatus for manufacturing spacer plate 10 for subsequent installation into an internal combustion engine, for example. A roll of material 31 in sheet form is arranged to suitably feed the sheet between a male die 32 and a female die 33 for sequentially stamping the sheets into the configuration illustrated in FIG. 1. As suggested above, one or more additional stamping operations may be required wherein it is desirable to form additional openings through selected ones of the sheets, e.g., holes 16 and 16' and slot 24 in FIG. 4. Subsequent to the stamping operation, each sheet may be passed through a cleaning and deburring station comprising cleaning nozzles 34 for ejecting a cleaning solution over the formed plates and a deburring tool 35 for grinding off burrs, if any. Each sheet may be then passed through a securing and sealing station wherein a suitable bonding agent or adhesive 36 is applied to at least one surface of each of the sheets.

The plurality of sheets, such as the illustrated four sheets 11-14, are then positioned within a press comprising members 37 and 38 for compressing the sheets together into their final form. As shown, a plurality of locating pins 39 may be secured to member 13 to be positioned in some of the bolt holes 17 to properly align the sheets in superimposed relationship. The adhesive is allowed to cure whereby the finished article, illustrated in FIG. 1, is adapted for installation into an engine (FIG. 3). As suggested above, alternative methods may be employed to secure the sheets together, such as furnace brazing or resistance or electric welding. The latter method, wherein a plurality of spot welds may be utilized, may also require the utilization of an adhesive seal between the contacting surfaces of the sheets to provide a complete seal between the sheets to prevent fluid leakage therebetween.

The spacer plate thus formed will not require costly machining operations, such as drilling, grinding and counterboring, as would be true with the type of conventional one-piece spacer plate 28 illustrated in FIG. 6. The exposed surfaces of outer sheets 11 and 14, for example, are formed flat and require no additional machining. Due to the laminated construction of the spacer plate, it will exhibit strength characteristics which cannot be achieved by a conventional one-piece plate and since the stamping operation performed by dies 32 and 33 is formed on a relatively thin sheet of material (e.g., 2.54 mm.), the various openings 15-17 may be completed in one stamping operation, depending upon the particular application, without distorting the sheet to precisely hold the tolerances required for the various openings. It should be further noted, that a plurality of slots 40 (FIG. 1) are preformed through the sheets comprising spacer plate 10 to communicate the combustion chambers of the engine with the inlet and exhaust manifolds thereof. In contrast thereto, a conventional one-piece spacer plate (FIG. 6) requires that such slots be formed by relatively costly burning and/or machining operations. As further described above, relatively complex passage ways, such as the one defined by slot 24 in plate 12 (FIG. 4) may be conveniently defined in the spacer plate by suitably preforming and stamping the individual sheets comprising the spacer plate.

Other aspects, objects and advantages of this invention can be obtained from a study of the drawings, disclosure and the appended claims.

What is claimed is:

1. A method for preforming and mounting a laminated spacer plate (10) in an internal combustion engine to space the head (19) and block (18) thereof at substantially the thickness of a support flange (21) of each cylinder liner (20) employed in said engine comprising the steps of forming a plurality of openings (15,16,17,40) through each of a plurality of separate sheets (11-14), aligning said sheets (11-14) in superimposed relationship relative to each other to align at least some of said openings (15,16,17,40) with respect to each other, securing said sheets (11-14) together to form a laminated spacer plate (10) having a composite thickness at least substantially the same as the thickness of the support flange (21) of said liner (20), mounting said laminated spacer plate (10) in sandwiched relationship between the head (19) and block (18) of said internal combustion engine so that the laminated spacer plate (10) is seated adjacent the support flange (21) of each cylinder liner (20), and mounting a sealing gasket (22,23) between said spacer plate (10) and each of said head (19) and said block (18).

2. The method of claim 1 further comprising the step of stamping (32,33) each sheet (11-14) out of an endless roll (31) of material while simultaneously forming said plurality of openings (15,16,17,40) through each of said sheets (11-14).

3. The method of claim 1 wherein the step of forming a plurality of openings (15,16,17,40) through each of said sheets (11-14) comprises the step of forming a plurality of cylinder bore openings (15), bolt holes (17), fluid director ports (16), and inlet and exhaust slots (40).

4. The method of claim 1 further comprising the step of cleaning (34) said sheets (11-14) prior to the step of securing said sheets (11-14) together.

5. The method of claim 4 further comprising the step of deburring (35) each of said sheets (11-14) prior to securing said sheets (11-14) together.

6. The method of claim 1 wherein said step of aligning said sheets (11-14) in superimposed relationship relative to each other comprises the step of disposing locator pins (39) in some of the openings (17) formed through said sheets (11-14).

7. The method of claim 1 wherein the step of securing said sheets (11-14) together comprises the step of coating at least some of the surfaces of said sheets (11-14) with an adhesive (36) and compressing (37,38) said sheets (11-14) together.

* * * * *